(12) United States Patent
Fu et al.

(10) Patent No.: US 12,189,844 B2
(45) Date of Patent: Jan. 7, 2025

(54) EYE-GAZE TRACKING APPARATUS AND A METHOD OF EYE-GAZE TRACKING

(71) Applicant: The Education University of Hong Kong, Tai Po (HK)

(72) Inventors: Hong Fu, Tai Po (HK); Bin Fu, Tai Po (HK); Yang Zheng, Tai Po (HK); Ruimin Li, Tai Po (HK)

(73) Assignee: The Education University of Hong Kong, Tai Po (HK)

( * ) Notice: Subject to any disclaimer, the term of this patent is extended or adjusted under 35 U.S.C. 154(b) by 77 days.

(21) Appl. No.: 18/093,447

(22) Filed: Jan. 5, 2023

(65) Prior Publication Data

US 2024/0094808 A1 Mar. 21, 2024

(30) Foreign Application Priority Data

Sep. 13, 2022 (HK) .......................... 32022060168.8

(51) Int. Cl.
*G02B 27/01* (2006.01)
*G06F 3/01* (2006.01)
*G06T 7/80* (2017.01)

(52) U.S. Cl.
CPC ............... *G06F 3/013* (2013.01); *G06T 7/80* (2017.01)

(58) Field of Classification Search
CPC . G06F 3/01; G06F 3/011; G06F 3/012; G06F 3/013; G06T 7/80; G06T 19/00; G06K 9/00; G06K 9/32; G06K 9/62; G02B 27/01
See application file for complete search history.

(56) References Cited

U.S. PATENT DOCUMENTS

| | | | |
|---|---|---|---|
| 9,185,352 B1* | 11/2015 | Jacques | H04N 7/18 |
| 10,928,635 B1* | 2/2021 | Trail | G02B 6/0023 |
| 2021/0166341 A1* | 6/2021 | Bastani | G06T 15/005 |
| 2021/0319420 A1* | 10/2021 | Yu | G06V 20/52 |
| 2022/0221932 A1* | 7/2022 | Bathiche | G06N 3/04 |
| 2023/0119935 A1* | 4/2023 | Sztuk | G06F 3/011 |
| | | | 345/8 |

FOREIGN PATENT DOCUMENTS

| | | |
|---|---|---|
| CN | 104089606 A | 10/2014 |
| CN | 110032278 A | 7/2019 |
| CN | 111201502 A | 5/2020 |
| CN | 111951332 A | 11/2020 |
| CN | 114120432 A | 3/2022 |

* cited by examiner

*Primary Examiner* — Michael A Faragalla
(74) *Attorney, Agent, or Firm* — KPIP Law, PLLC; Kimberly A Peaslee

(57) ABSTRACT

An eye-gaze tracking apparatus and a method of eye-gaze tracking. The eye-gaze tracking apparatus comprises: a plurality of foreground cameras each arranged to capture at least a portion of a target view area of a user; and an eye-gaze estimation module having at least one eye-gaze camera each arranged to capture an image an eye of the user, so as to estimate a position of a pupil of the eye based on the image of the eye; wherein each of the plurality of foreground cameras includes a field-of-view (FOV) being different from each other.

18 Claims, 9 Drawing Sheets

EYE-GAZE TRACKING APPARATUS AND A METHOD OF EYE-GAZE TRACKING

TECHNICAL FIELD

The invention relates to an eye-gaze tracking apparatus and a method of eye-gaze tracking, and particularly, although not exclusively, to a high-precision eye-gaze tracking apparatus.

BACKGROUND OF THE INVENTION

When an observer's attention to the target shifts, the observer's eyes also move. It is estimated that 80% of information that humans get from their surroundings comes from vision. Therefore, by tracking a person's pupil movement or analyzing the change in their gaze position, it is possible to estimate the observer's attention.

Eye/gaze tracking may be determined by direct observation, mechanical recording and optical recording. For example, the optical recording method, video-based method and corneal reflex method may be used to study eye movement, therefore more accurate eye movement data may be obtained by optical equipment. Eye tracking technology may involve computer vision and pattern recognition, and the technology may be widely used in many fields, such as human-computer interaction (HCI), driver assistance, scene research and medical diagnosis.

SUMMARY OF THE INVENTION

In accordance with a first aspect of the present invention, there is provided an eye-gaze tracking apparatus, comprising: a plurality of foreground cameras each arranged to capture at least a portion of a target view area of a user; and an eye-gaze estimation module having at least one eye-gaze camera each arranged to capture an image an eye of the user, so as to estimate a position of a pupil of the eye based on the image of the eye; wherein each of the plurality of foreground cameras includes a field-of-view (FOV) being different from each other.

In accordance with the first aspect, the plurality of foreground cameras include a wide-angle camera having a first FOV and a magnified camera having a second FOV smaller than the first FOV.

In accordance with the first aspect, the second FOV equals to 60° diagonal.

In accordance with the first aspect, each of the at least one eye-gaze camera includes an infrared camera arranged to capture an infrared image of the eye of the user.

In accordance with the first aspect, the eye-gaze tracking apparatus further comprises at least one infrared LED arranged to illuminate the eye of the user.

In accordance with the first aspect, the eye-gaze tracking apparatus further comprises a calibration module arranged to facilitate a calibration of the eye-gaze estimation module according to characteristics of the eye of the user.

In accordance with the first aspect, the calibration module is arranged to provide a plurality of displayed markers such that the eye-gaze estimation module is arranged to map a plurality of calibration positions of the pupil of the eye to the plurality of displayed markers overlaid at different positions in the target view area of a user.

In accordance with the first aspect, the calibration module includes a plurality of physical markers such that the eye-gaze estimation module is arranged to map a plurality of calibration positions of the pupil of the eye to the plurality of physical markers disposed at different positions in the target view area of the user.

In accordance with the first aspect, the calibration module is arranged to facilitate the eye-gaze estimation module with respect to different target view areas of a user associated with different FOVs of the plurality of foreground cameras.

In accordance with the first aspect, the eye-gaze estimation module includes a neural network arranged to process the image of the eye captured by the at least one eye-gaze camera so as to estimate an eye-gaze angle of the user associated with the position of the pupil of the eye.

In accordance with a second aspect of the present invention, there is provided a method of eye-gaze tracking, comprising the steps of: capturing at least a portion of a target view area of a user using a plurality of foreground cameras; and capturing an image an eye of the user using an eye-gaze camera, so as to estimate a position of a pupil of the eye based on the image of the eye; wherein each of the plurality of foreground cameras includes a field-of-view (FOV) being different from each other.

In accordance with the second aspect, the plurality of foreground cameras include a wide-angle camera having a first FOV and a magnified camera having a second FOV smaller than the first FOV.

In accordance with the second aspect, the second FOV equals to 60° diagonal.

In accordance with the second aspect, each of the at least one eye-gaze camera includes an infrared camera arranged to capture an infrared image of the eye of the user.

In accordance with the second aspect, the method further comprises the step of illuminating the eye of the user using at least one infrared LED.

In accordance with the second aspect, the method further comprises the step of calibrating an eye-gaze estimation module according to characteristics of the eye of the user, wherein the eye-gaze estimation module is arranged to estimate the position of the pupil of the eye.

In accordance with the second aspect, the step of calibrating the eye-gaze estimation module comprises the steps of: providing a plurality of displayed markers overlaid at different positions in the target view area of a user; and mapping a plurality of calibration positions of the pupil of the eye to the plurality of displayed markers.

In accordance with the second aspect, the step of calibrating the eye-gaze estimation module comprises the steps of: disposing a plurality of physical markers at different positions in the target view area of the user; mapping a plurality of calibration positions of the pupil of the eye to the plurality of physical markers.

In accordance with the second aspect, the eye-gaze estimation module is calibrated with respect to different target view areas of a user associated with different FOVs of the plurality of foreground cameras.

In accordance with the second aspect, the method further comprises the step of processing the image of the eye captured by the at least one eye-gaze camera using a neural network, so as to estimate an eye-gaze angle of the user associated with the position of the pupil of the eye.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENTS

The inventors devised that example eye tracking systems may be categorized into head-mounted and desktop-based on different applications, and the system accuracy of these eye tracker may range from 0.5 degrees to 1 degree. Without wishing to be bound by theory, the actual average gaze accuracy may vary much, sometimes over 3 degrees, depending on the calibration and applications. A tracking error of 3 degrees is roughly equivalent to a square of $1.5*1.5$ cm$^2$ in reading distance. This error may lead to large bias for some tracking tasks related to hand writing, e.g. writing a Traditional Chinese character in a $1.5*1.5$ cm$^2$ lattice.

Figure 1:
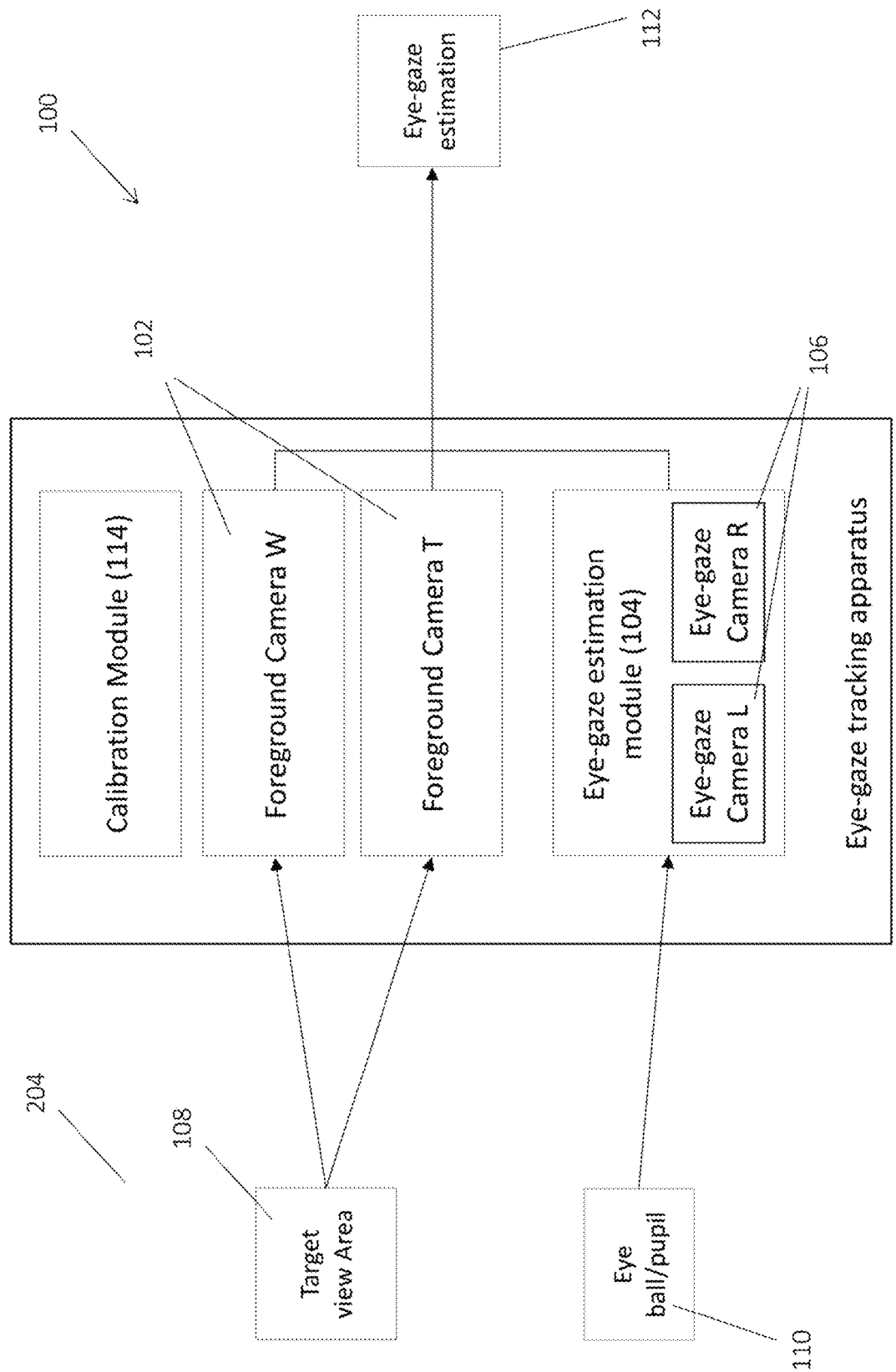
FIG. 1 is a block diagram of an eye-gaze tracking apparatus in accordance with an embodiment of the present invention.

With reference to FIG. 1, there is shown an example embodiment of an eye-gaze tracking apparatus 100, comprising: a plurality of foreground cameras 102 each arranged to capture at least a portion of a target view area 108 of a user; and an eye-gaze estimation module 104 having at least one eye-gaze camera 106 each arranged to capture an image an eye of the user, so as to estimate a position of a pupil of the eye based on the image of the eye 110; wherein each of the plurality of foreground cameras 102 includes a field-of-view (FOV) being different from each other.

In this example, the eye-gaze tracking apparatus 100 includes two sets of cameras, such as a set of foreground cameras 102 and a set of eye-gaze cameras 106 which may be installed on a head mounted device. When the head mounted devices is worn by a user, the foreground cameras 102 and the eye-gaze cameras 106 may capture images of both the target view of a user as well as the images of the eyes of the user simultaneously. Advantageously, by providing also the target views of the user, an accuracy of the eye gaze estimation may be improved significantly.

Figure 2:
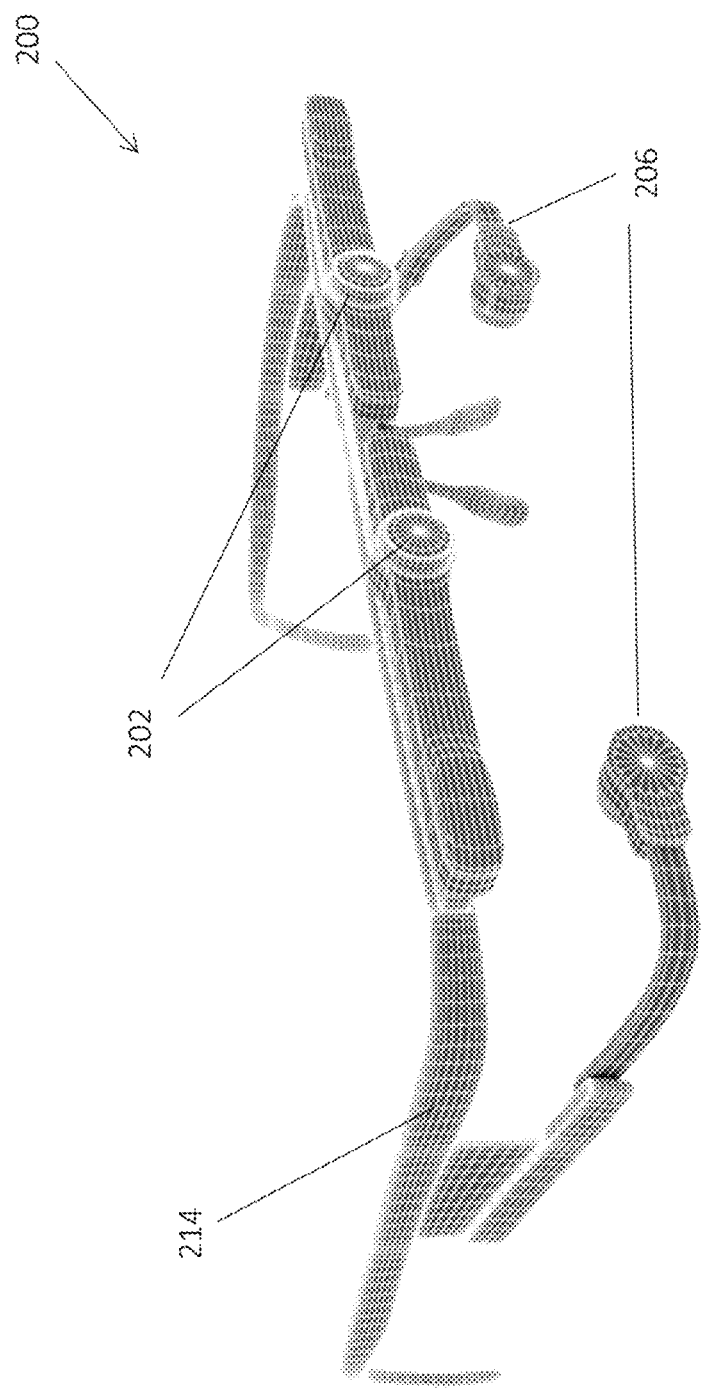
FIG. 2 is a perspective view showing an eye-gaze tracking apparatus including two foreground cameras and two eye-gaze cameras in accordance with an embodiment of the present invention.

For example, when a user wears an example head mounted eye-gaze apparatus 200 as shown in FIG. 2, foreground cameras 102 facing the front of the front view of the user captures images or series of images of what the user sees, i.e. target view area of a user, in addition, the image of the eye ball is also captured by the eye-gaze cameras 106 provided at both sides of a face of the user, so as to determine the eye-gaze positions of the user, e.g. by analysing the position of the pupil of each of the eyes of the user, and to determine where the user is reading or looking at. The estimation of the eye-gaze position/angle 112 may be further improved by taking into the account of the target view area captured by the foreground cameras, and the method is further described later in this disclosure.

Example gaze tracking systems and their performance are listed in the Table below. There are two example types of gaze-tracking methods: model-based and appearance-based.

| Examples | Canada SR | America ASL | Germany SMI | Japan ISCAN |
|---|---|---|---|---|
| System Name | EyeLink | 501 | IView | ETL 500 |
| Optical Performance | Head-mounted | Head-mounted | Head-mounted | Head-mounted |
| Sampling Frequency | 250 Hz | 50 Hz/60 Hz | 50 Hz/60 Hz | 60 Hz |
| Tracking Principle | Pupil/corneal reflex | Pupil/corneal reflex | Pupil/corneal reflex | Pupil/corneal reflex |
| Gaze Accuracy | 0.5 | 0.5~1.0 | 0.5~1.0 | 0.5~1.0 |
| Scene Camera FOV | H: +/−45 V: +/−35 | H: +/−50 V: +/−40 | H: +/−30 V: +/−25 | H: +/−25 V: +/−25 |
| Head Position Tracker | Video | Electro-magnetic | Electro-magnetic | Electro-magnetic |

The key idea of appearance-based method builds on the mapping from the eye images to gaze positions. Appearance-based gaze tracking system can predict gaze direction with low-resolution images and it need a large volume of training data. For example, an adaptive linear regression method may be used for accurate gaze mapping via sparsely collected training samples. Alternatively, a head pose invariant gaze estimation model may be used for distant RGB-D cameras, in this example, a consumer RGB-D camera may be used to model head-pose rectified eye images recovered.

In addition, appearance-based methods have the potential to predict gaze direction without calibration. For example, a low cost and convenient eye gaze tracking system may be built without specific hardware and cumbersome calibration process, in which a web camera may be used to capture user's face video from which they can extract the eye regions. By integration of the eye vector and the head movement information, the eye gaze tracking is accomplished.

In yet an alternative example, explicit personal calibration may be eliminated, by using a regression based deep convolutional neural network to learn image features for predicting eye fixation. In addition to the neural network, a framework for activity recognition using gaze data from head-mounted eye tracker may be employed.

Without wishing to be bound by theory, compared to model-based methods, appearance-based methods may be unable to handle free head movement well and need a lot of sample data.

The model-based method may achieve a better accuracy and ability to handle free head movement. Employed with multiple camera and infrared lights, however, the model-based gaze tracking system may need to be calibrated before using. In one example embodiment, a mobile gaze-tracking system with near-eye display based on a combined gaze-tracking algorithm may be used, the mobile gaze-tracking system may be built using a combined gaze estimation method based on CNN and a geometric model to get the accurate gaze position estimation. In an alternative example, a unified 3D eye model may be built to relate gaze directions and eye features, and by using the model the system may perform real time gaze tracking given the 3D coordinates of eye features from the camera hardware being used.

In an alternative system provided as an alternative form of human computer interaction by using a smartphone or tablet computer and its front camera. In this example, the camera captures user's facial images and an eye tracking model may be built in which user can control applications by moving their eyes or head. Alternatively, a new remote gaze tracking system may be used for large display, in which a wide view camera for detecting eye position and a narrow view camera for capturing magnified eye images.

In an alternative distributed camera framework built for driver's gaze zone estimation by using head pose dynamics, the system can operate robustly and continuously even during large head movements. Alternatively, a gaze tracking method may be used together with an ultrasonic sensor so that the system is robust to the natural head movement of users, or experimental measurements may be considered to determine the amount and velocity of the user's head movements.

The inventors devise that eye-gaze tracker may be used in many fields. Its systemic precision depends on the performance of the devices, and it is also an essential parameter for the evaluation of the data quality. Therefore, the impact of infrared intensity should be illustrated.

Preferably, the plurality of foreground cameras 102 includes a field-of-view (FOV) being different from each other, e.g. one being a wide-angle camera and one being a "tele" camera or a magnified camera, such that the system is able to estimate the visual focus of the user as well as a wider view of the user. To meet this requirement, preferably, the wide-angle camera has a first FOV and the magnified camera having a second FOV, e.g. 60° diagonal, which is smaller than the first FOV, e.g. 100° diagonal.

Referring to FIG. 2, the eye-gaze tracking apparatus 100 may be implemented as a fine eye tracking system or an eye-gaze tracker 200 which includes two foreground cameras 202, namely a "World Camera" and a "Magnified World Camera" with different FOV, and two near-eye infrared viewing cameras 206. The FOV of the World Camera includes the entire target area, or a "rough" foreground images, whereas the Magnified World Camera's FOV is associated with a "focus" view or within a specific range or portion in the target area to obtain finer foreground images of the specific area. In this example, the two foreground cameras 202 and the two near-eye infrared viewing cameras 206 are mounted on a frame 214 which may be worn by a user similar to wearing a pair of glasses.

In addition, two near-eye infrared observation cameras 206 respectively acquire left and right eye images for calculating pupil position, each arranged to capture an infrared image of the eye of the user. Optionally, the apparatus 200 may be provided with at least one infrared LED (not shown) arranged to illuminate the eye of the user, so as to improve the image quality of the infrared images captured by the infrared eye-gaze cameras 206.

Advantageously, the abovementioned embodiment is different from other example gaze-tracking system which may only capture rough foreground images which are not suitable for tracking the subtle gaze movements such as writing a Traditional Chinese character in a 1.5*1.5 cm² lattice. Advantageously, the additional foreground camera may be used to capture fine foreground images.

As shown in the table below, the World Camera in the eye-gaze tracking apparatus in one example embodiment, may include a 100-degree diagonal FOV and can capture a video stream of the users FOV at 30 Hz. The highest image resolution can be 1920*1.080 pixel. In addition, the Magnified World Camera has a 60-degree diagonal FOV. The sampling frequency and the maximum resolution of the captured images are preferably the same as those of the world camera.

In addition, two eye cameras are infrared camera and can capture user's eye images at 200*200 pixels at 200 Hz. Their package size is 10*45*7 mm which can reduce the amount of visual obstruction for the user and keep the headset lightweight. In addition, there is a surface mounted IR LED at 860 nm wavelength next to each eye camera to illuminate the user's eye.

|  | World camera | Magnified world camera | Eye camera |
|---|---|---|---|
| Resolution | 1080p/720p 480p | 1080p/720p 480p | 200 * 200 pixels |
| FOV | 1.00° diagonal | 60° diagonal | |
| Camera Latency | 4.5 ms | 4.5 ms | 4.5 ms |
| Sampling Frequency | 30 Hz/60 Hz/ 120 Hz | 30 Hz/60 Hz/ 120 Hz | 200 Hz |

It should be appreciated by a skilled person in the art that each of the foreground cameras and the eye-gaze cameras may include other specifications (e.g. resolution, FOV, Camera latency and/or sampling frequency) depending on different applications of eye-gaze estimation.

Referring back to FIG. 1, the eye-gaze tracking apparatus 100 further comprises a calibration module 114 arranged to facilitate a calibration of the eye-gaze estimation module 104 according to characteristics of the eye of the user. For example, before using the eye tracker to estimate gaze position, the eye-gaze tracking apparatus 100 may be calibrated for each of different users, so as to improve the eye-gaze estimation obtained by analysing the images provided by the cameras.

For example, an initial calibration may be performed to allow the eye-gaze tracking apparatus 100 to learn the characteristics of the participant's eye movement and estimate the participant's gaze position accurately. Preferably, the calibration module may provide a plurality of displayed markers such that the eye-gaze estimation module 104 is arranged to map a plurality of calibration positions of the pupil of the eye to the plurality of displayed markers overlaid at different positions in the target view area of a user. Alternatively, the calibration module may include a plurality of physical markers for being captured by the foreground cameras, such that the eye-gaze estimation module 104 is arranged to map a plurality of calibration positions of the pupil of the eye to the plurality of physical markers disposed at different positions in the target view area of the user. For example, a Screen Marker Calibration and Manual Marker Calibration routine may be included in the calibration process.

Figure 3:
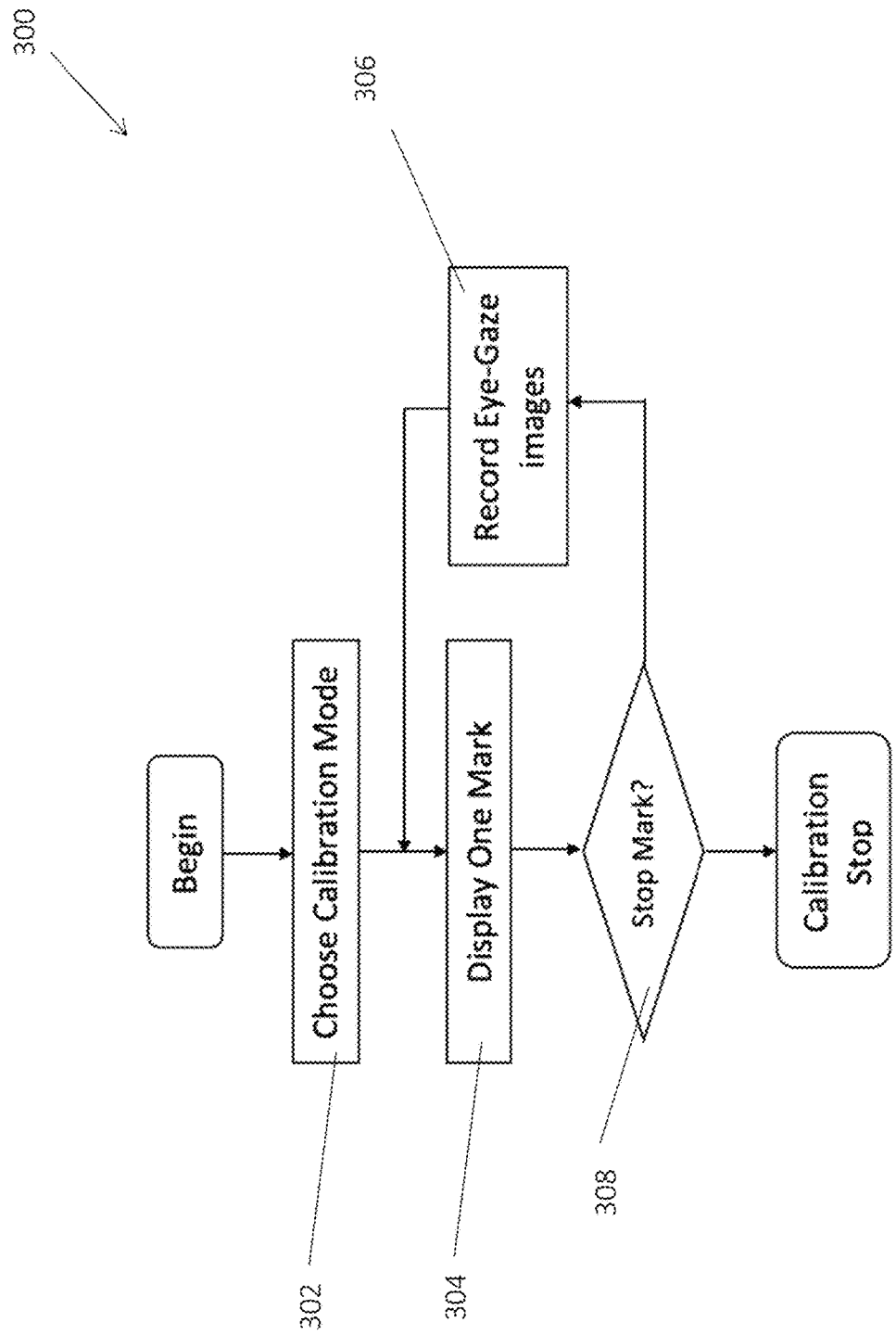
FIG. 3 is a flow diagram showing a calibration processed performed for calibrating the eye-gaze tracking apparatus of FIG. 1.

Referring to FIG. 3, there is shown an example calibration process 300. The process starts with choosing different calibration mode at step 302, e.g. for calibrating different foreground cameras, such that the calibration module may facilitate the eye-gaze estimation module 104 with respect to different target view areas of a user associated with different FOVs of the plurality of foreground cameras 102.

Figure 4:
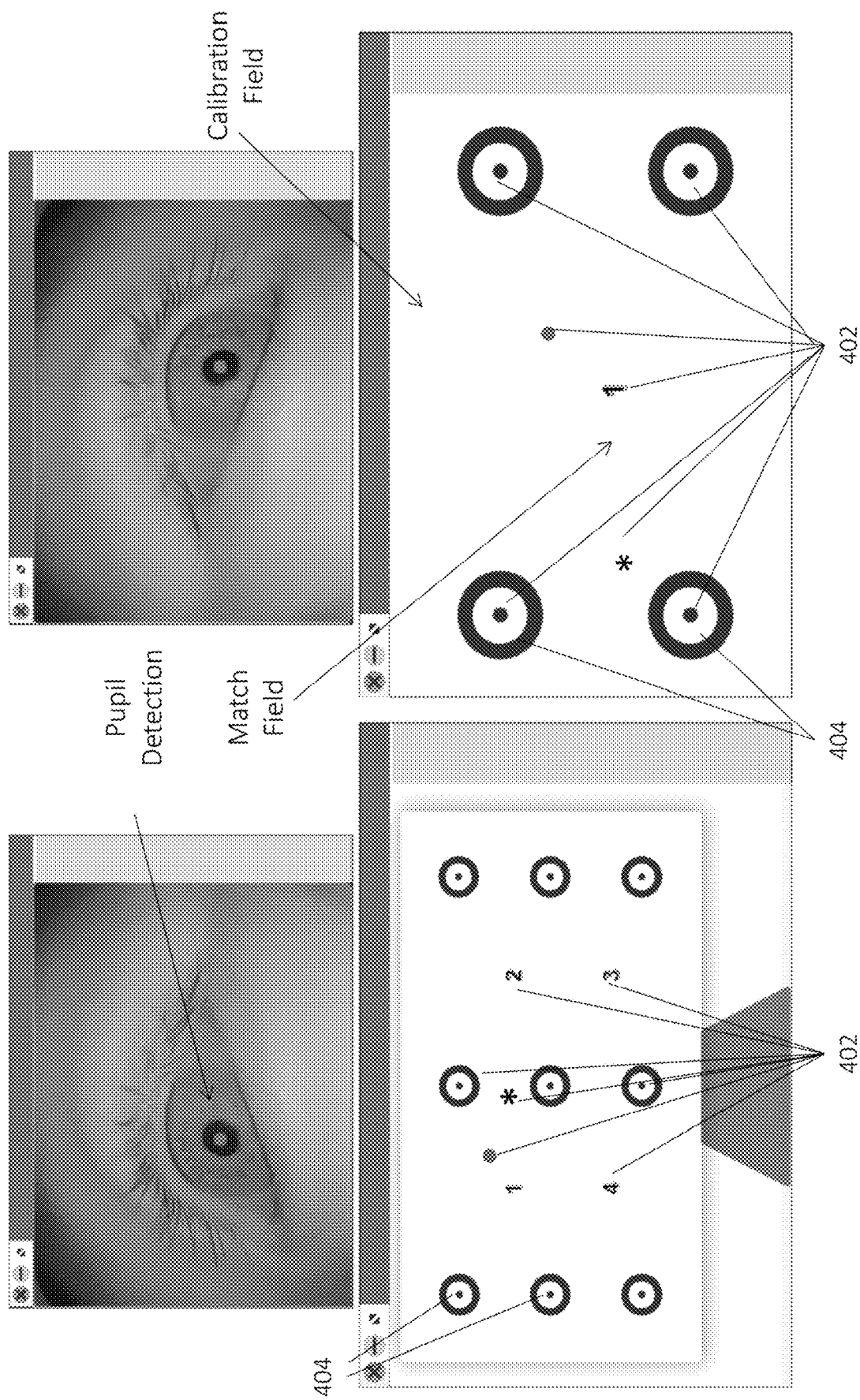
FIG. 4 are images showing images of eyes of a user and foreground images captured by the eye-gaze tracking apparatus of FIG. 2 in a calibration process.

Referring also to FIG. 4, nine calibration markers 402 are distributed evenly for calibration of the world Camera. Depending on the number of calibration marks, there may be different calibration schemes, such as five marks, nine marks and so on. Considering the calibration speed and accuracy, the example of nine marks scheme for initial calibration in the experiment is described in this example.

The calibration is performed by "displaying" or identifying one of the multiple marks placed within the target view area of the user at step 304, and then the eye-gaze (i.e. the pupil's) position is recorded at step 306. Repeating the above steps until all the calibration marks have been recorded and the calibration ends with detecting a stop mark at step 308.

For example, in Screen Marker Calibration mode, nine markers are displayed on screen in sequence. When a marker is detected in the image captured by world camera, the next marker is displayed. In Manual Marker Calibration mode, concentric circle markers 404 which may be moved freely within a user's FOV, may be placed at a predetermined position. One marker pattern is used to collect samples for calibration, another marker pattern is used to stop the calibration process. During the calibration process, the user may need to keep staring at the marker until it disappears or be moved to the next location.

The two world cameras may me calibrated separately. The two world cameras may be aligned with the area to be calibrated and maintain a suitable distance. The FOV of World Camera covers the entire area and the Magnified World Camera can acquire fine images of specific locations. In the eye-gaze estimation apparatus, World Camera and Magnified World Camera may employ the same or different methods to be calibrated separately.

In order to obtain a finer gaze position estimation, the FOV of two world cameras may be matched by mapping the gaze estimation position of Magnified World Camera within the matching area to the foreground image of World Camera.

Four markers 404 may be set in the fixed position of the foreground and may be distributed in the four corners of matching area. Then a rectangular area consisted of the four markers 404 may be obtained both in images obtained from World Camera and Magnified World Camera which are matching areas. When performing the foreground camera 102 gaze position estimation, the gaze estimation position in images may be firstly obtained by the Magnified World Camera. Then according to the relative position of the gaze estimation position in rectangle formed by four markers, the matching gaze estimation position in images of World Camera may also be obtained.

Since the Magnified World Camera has a small FOV and only display part of the foreground area. Therefore, an accurate gaze position estimate cannot be obtained for the position outside the matching area. So, the position of the gaze estimation in World Camera images is taken as the final gaze estimation position in this area.

As shown in FIG. 4 the black rectangular is the matching area marked by four markers 404. The point (marks as asterisk) is the gaze estimation point in the large and small foreground fields of view after calibration. In the images captured by Magnified World Camera, the lattices can be seen more clearly and the gaze estimates are more refined.

Preferably, referring to the top two images at the top of FIG. 4, a "dark pupil" detection method may be employed, for determining the position of the pupil for eye-gaze estimation. This may require the eye camera to capture video within a specific range of the IR spectrum. So, the light conditions may influence the gaze estimation accuracy of the eye tracker, and thus including an infrared LED for illuminating the eye of the user may help improving the accuracy of the eye-gaze estimation.

For example, as the visible light wavelength range is 380 nm~780 nm, different groups of light conditions with different intensities were setup by the inventors to evaluate the accuracy of the eye tracker's gaze position estimation under different light conditions. The eye-gaze estimation was obtained in every 20 nm band under each group using an optical power meter in the rage of 380 nm~780 nm. In each group, users' gaze positions were estimated of staring at 12 points uniformly distributed in the FOV of world camera. Among the 12 points, 9 points are in the matching area and another 3 points are outside the matching area. Each user conducted three repeated experiments and the two world cameras are recalibrated each time.

Preferably, the eye-gaze estimation module 104 includes a neural network arranged to process the image of the eye captured by the at least one eye-gaze camera 106 so as to estimate an eye-gaze angle of the user associated with the position of the pupil of the eye. A neural network may be included to learn the end-to-end mapping from the input features to gaze positions. The eye images collected by the eye tracking system may be used as input, and the two-dimensional coordinates of gaze positions are obtained by output. Advantageously, the distance to the target gaze point is vary and may be difficult to calibrate every time put it on. Thus implementing the system using a neural network may provide an advantage that leaving out calibration.

Figure 5:
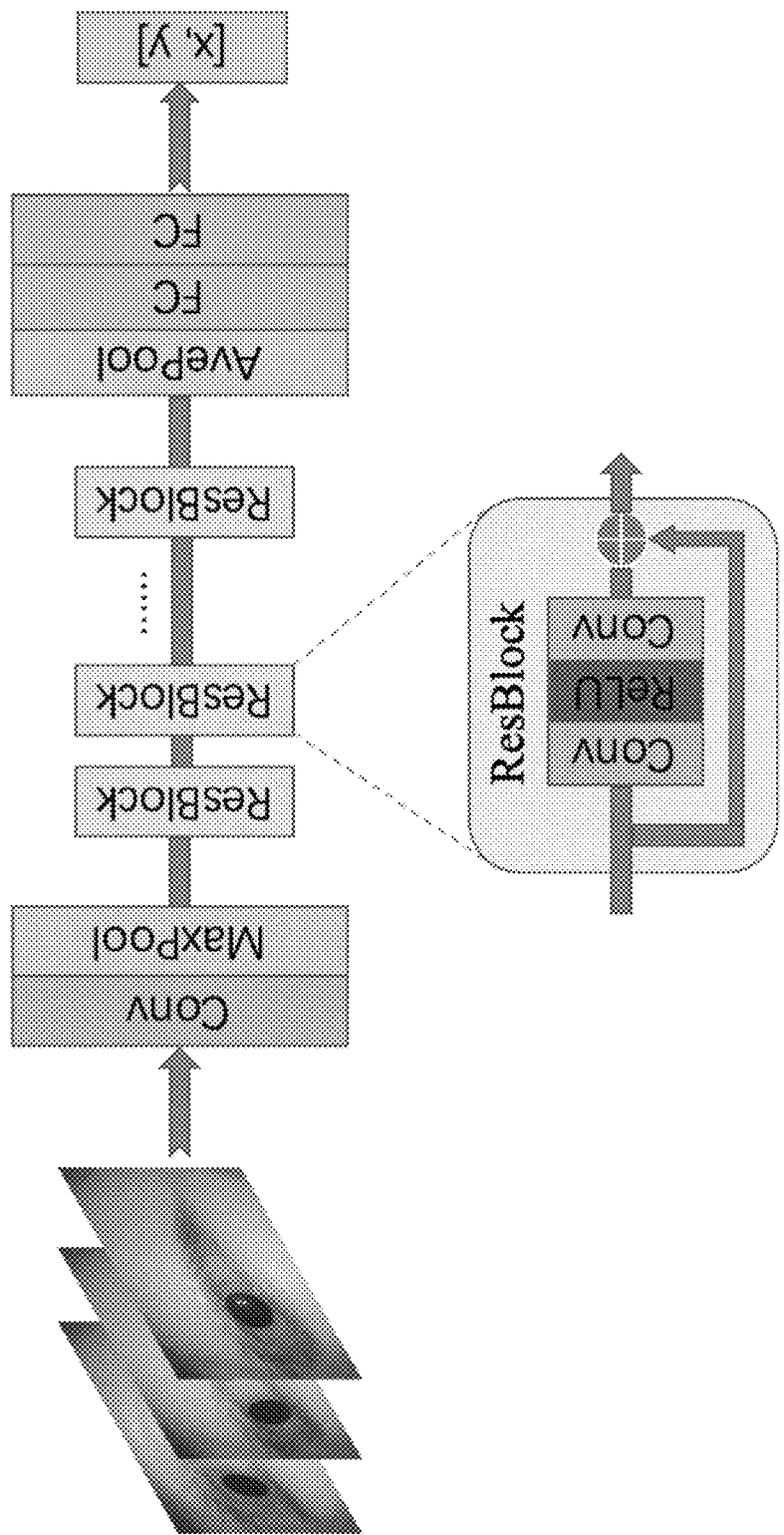
FIG. 5 is a flow diagram showing processing of input images by a neural network performing an end-to-end gaze mapping process.

For example, to achieve the end-to-end mapping, a classical ResNet structure may be adopted. The neural network may be based Resnet-18 that include 17 convolutional layers, two fully connected layers and two pooling layers. Referring to FIG. 5, the full connection layer of Resnet-18 added with a full connection layer to map the feature vector into two-dimensional coordinates may be used. During this process, the input may be resized to 224×224 before the first convolutional layer, then it may go through several residual blocks (ResBlock), and finally is flatten to a two-dimensional coordinate. To optimize the end-to-end mapping, the distance of the output and the label may be minimized using L2 loss function.

To evaluate the accuracy of gaze estimation of eye tracker or the eye-gaze tracking apparatus 100 in accordance with embodiments of the present invention, the inventors collected 15 participants' data in a normal environment. The participants' age ranges from 20 to 26 include males and females. Each participant needs to perform 3 repetitions of tests. Participants need to recalibrate the device for each test.

Figure 6:
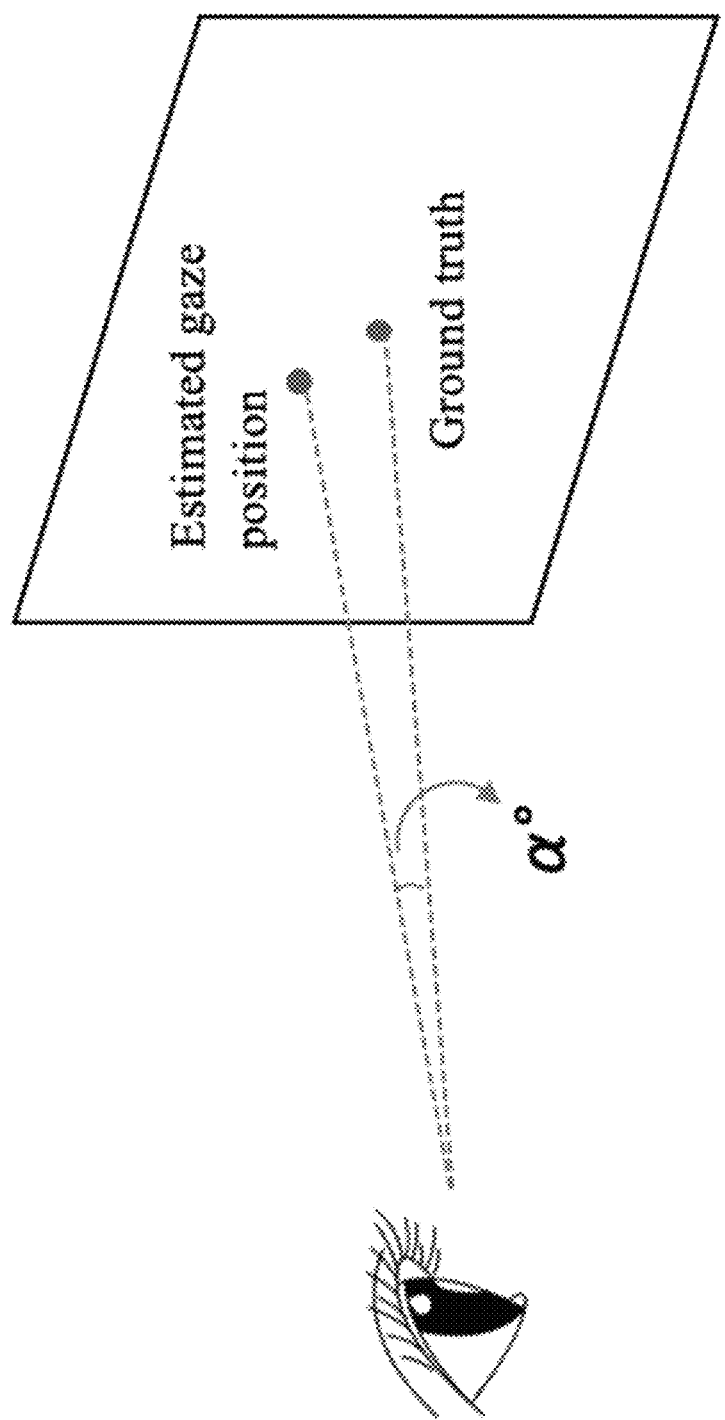
FIG. 6 is an illustration showing an error calculation method in accordance with an embodiment of the present invention.

In the experiments, the accuracy of the eye tracker is presented as the average offset between the point where the participant is looking and the gaze points estimated by the eye tracker. As shown in FIG. 6, α° was used to measure the offset between the estimated gaze position and ground truth.

The precision shows the eye tracker's ability to reliably reproduce a gaze point measurement and is computed as the standard deviation (SD) of the gaze points.

The following table shows the accuracy of gaze estimation by one world camera eye tracker and the modified two world camera eye tracker. The results show that the average accuracy of one world camera eye tracker is approximate 1.63°. After adding a magnified world camera, the accuracy can be significantly improved to 1.26°. Meantime, the precision of gaze estimation can be improved from 0.87° to 0.71° which means that the fine eye tracker has a more stable performance.

|  | World Cam | | Match | |
| --- | --- | --- | --- | --- |
| User | Avg | SD | Avg | SD |
| 1 | 1.16 | 0.29 | 0.57 | 0.407 |
| 2 | 1.96 | 0.84 | 1.38 | 0.796 |
| 3 | 1.39 | 0.97 | 1.69 | 0.663 |
| 4 | 0.88 | 0.31 | 0.62 | 0.352 |
| 5 | 1.65 | 0.7 | 0.95 | 0.423 |
| 6 | 2.01 | 1.34 | 0.52 | 0.198 |
| 7 | 1.68 | 0.89 | 1.42 | 1.03 |
| 8 | 1.86 | 0.76 | 1.49 | 0.75 |
| 9 | 1.97 | 0.77 | 1.08 | 0.35 |
| 10 | 1.56 | 1.10 | 1.86 | 0.76 |
| 11 | 1.81 | 0.88 | 1.64 | 0.97 |
| 12 | 1.97 | 1.22 | 1.62 | 1.17 |
| 13 | 1.49 | 1.14 | 1.23 | 0.84 |
| 14 | 1.68 | 1.05 | 1.16 | 1.09 |
| 15 | 1.43 | 0.85 | 1.68 | 0.89 |
| Average | 1.63 | 0.87 | 1.26 | 0.71 |

Figure 7:
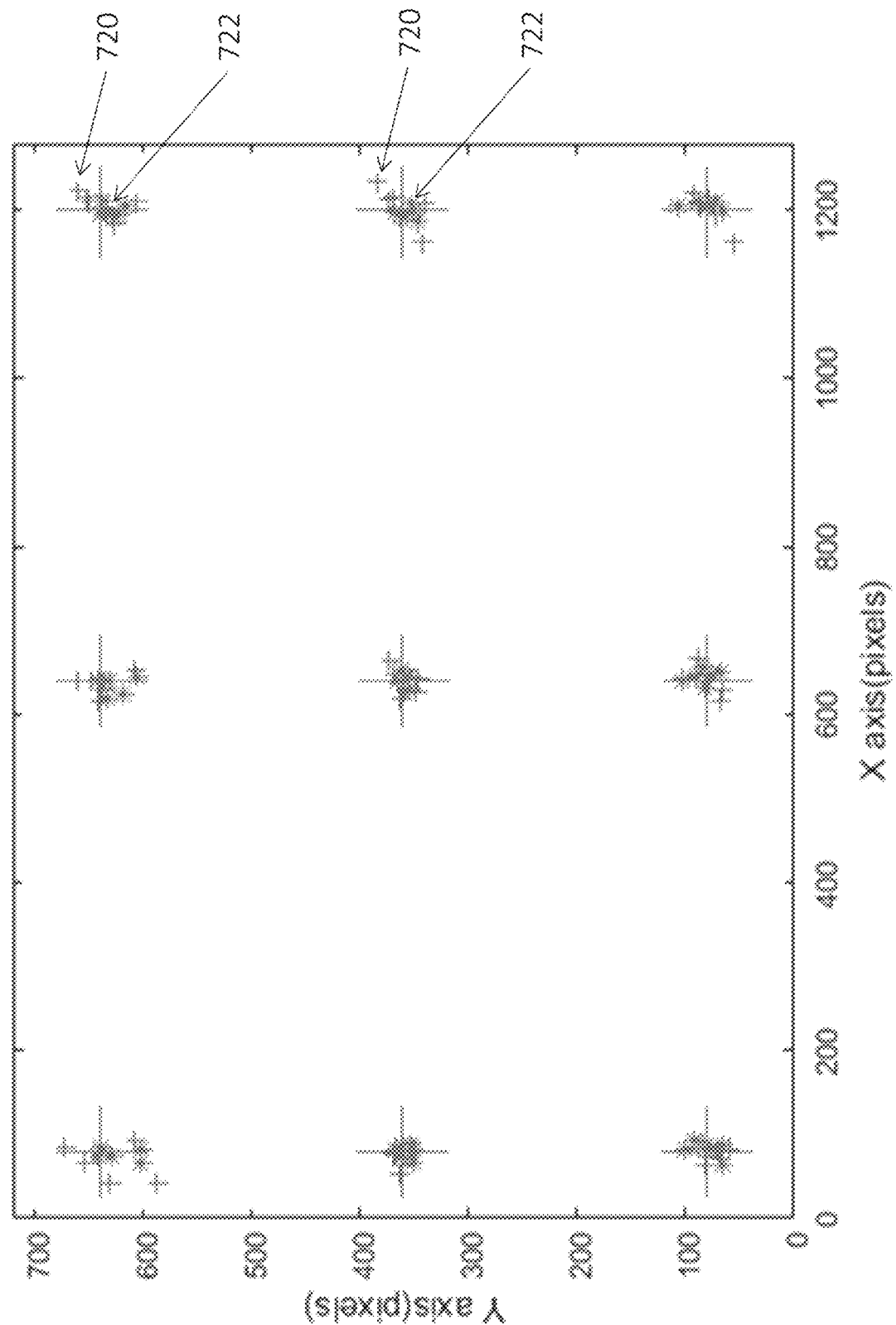
FIG. 7 is a plot showing a gaze estimation result of testing users using the eye-gaze tracking apparatus in accordance with an embodiment of the present invention.

FIG. 7 shows the gaze estimation results of six users. The image resolution acquired in the system is 1280*720 pixels. The plus (+) signs 720 are screen calibration points. The plus signs 720 are estimated gaze points with fine eye tracking and the asterisk (*) signs 722 are estimated gaze points with single world camera. In most cases, the gaze error in the y-direction is larger than that in the x-direction. Because the range of eye movement in the y-direction is smaller than that in x-direction and the eye motion in the y-direction is easier to detect. In addition, the plus signs 720 are more concentrated in the calibration points which mean the system has higher accuracy.

Figure 8A:
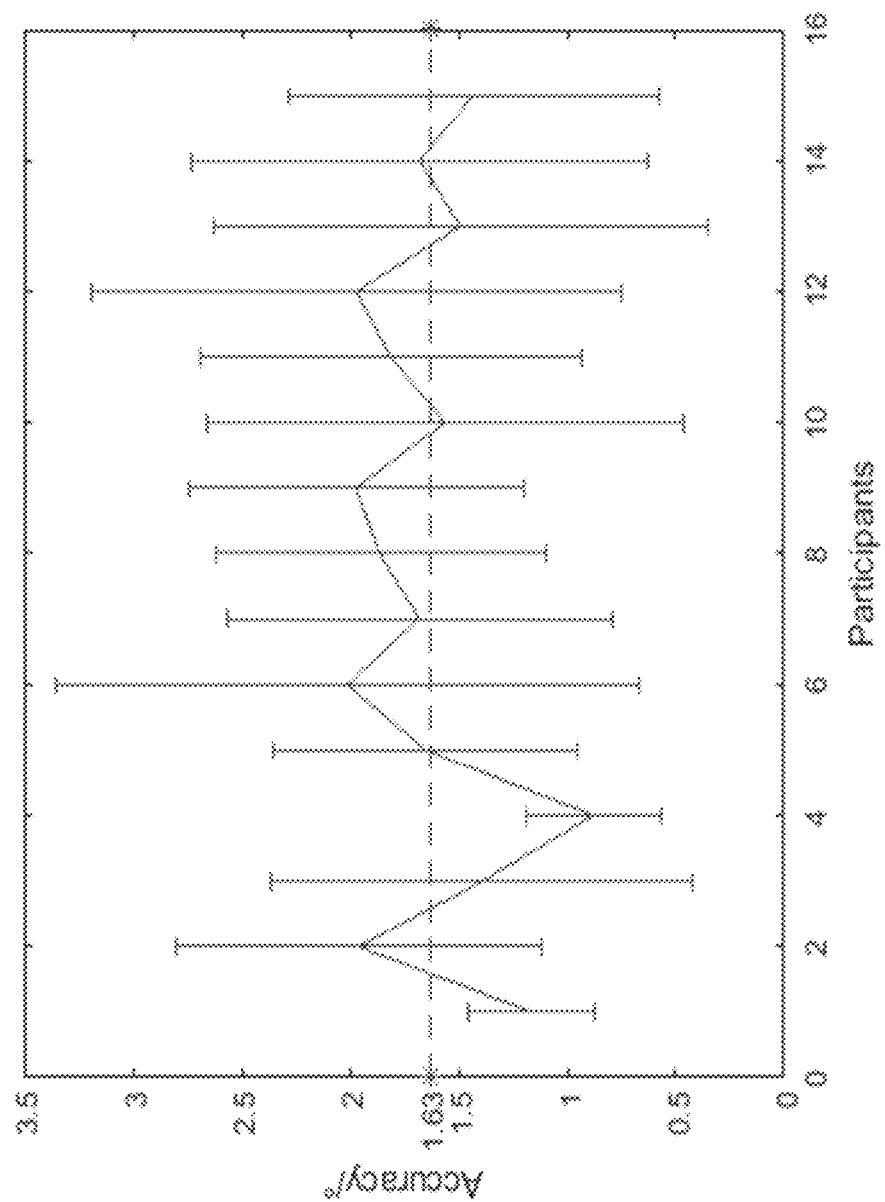
FIG. 8A is a plot showing an average accuracy with standard deviation of an example eye-tracker.
Figure 8B:
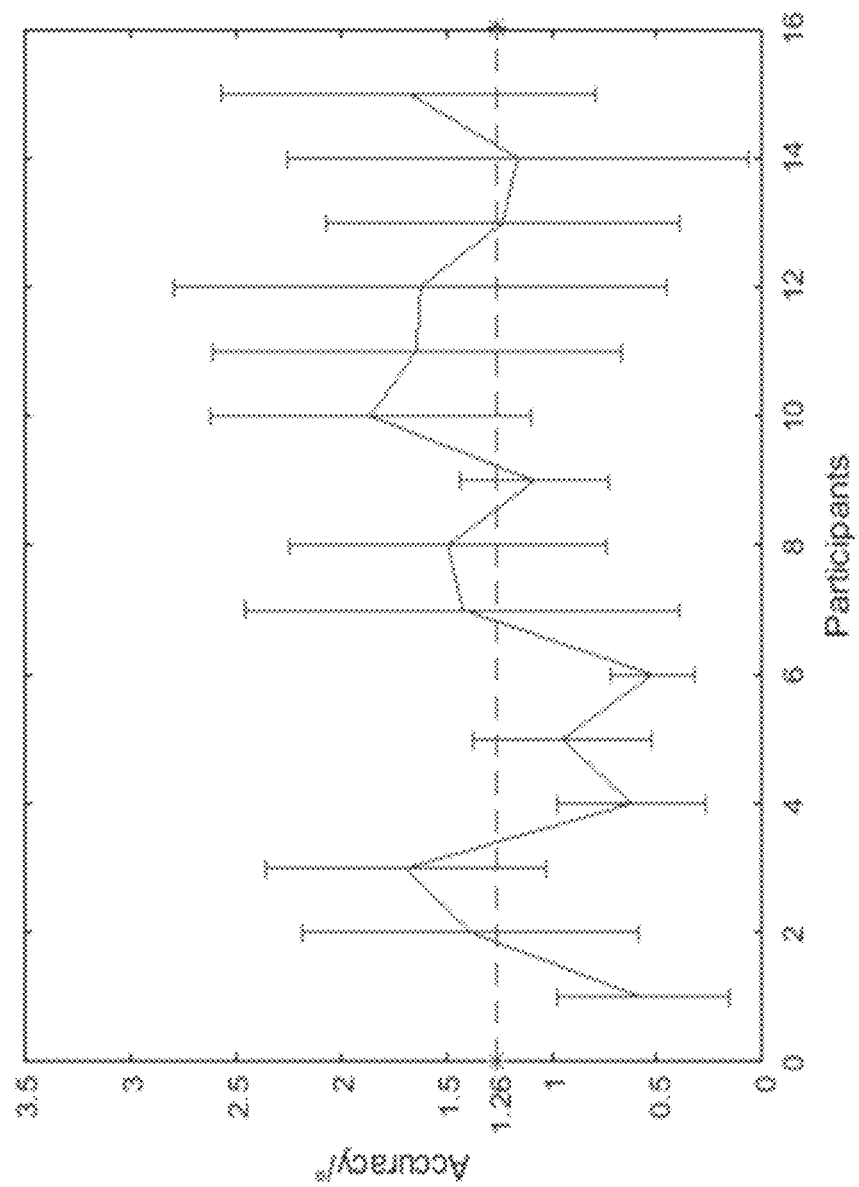
FIG. 8B is a plot showing an average accuracy with standard deviation of an eye-gaze tracking apparatus in accordance with an embodiment of the present invention.

With reference to FIGS. 8A and 8B, there is shown the average accuracy with standard deviation of original, eye tracker and Fine Eye Tracking tested by 15 participants. From the result, it may be observable that the system has low average error and standard deviation.

In order to verify the stability of the eye tracking system, the gaze estimation accuracy of the eye-gaze tracking apparatus 100 is compared with an example eye tracker under 6 different intensities of visible light conditions and repeat three experiments under each lighting condition. The 6 lighting intensities are 9.95, 15.62, 27.60, 37.60, 57.00 and 60.46 mW.

As shown in the Table below, the average error of the eye-gaze tracking apparatus 100 is 1.77° and the one obtained by an example eye tracker is 1.980 which means the eye-gaze tracking apparatus 100 has slightly higher accuracy. In addition, the precision of the eye-gaze tracking apparatus 100 is significantly improved from 0.811° to 0.487°.

The eye-gaze tracking apparatus accuracy in different intensity light

|  | Light | | | | | | | |
| --- | --- | --- | --- | --- | --- | --- | --- | --- |
| Index | 9.95 | 15.62 | 27.60 | 37.60 | 57.00 | 60.46 | Average | Stdev |
| 1 | 1.31 ± 0.65 | 1.78 ± 1.43 | 1.78 ± 2.26 | 1.83 ± 0.78 | 1.80 ± 1.03 | 1.55 ± 0.82 | 1.675 | 0.205 |
| 2 |  | 1.39 ± 0.83 | 1.52 ± 0.83 | 3.18 ± 1.29 | 2.57 ± 1.65 | 1.56 ± 0.65 | 2.044 | 0.791 |
| 3 |  | 1.37 ± 0.75 | 2.09 ± 1.16 | 2.45 ± 1.19 | 1.46 ± 0.65 | 1.55 ± 1.03 | 1.785 | 0.466 |
| Average | 1.31 | 1.51 | 1.80 | 2.49 | 1.94 | 1.55 | 1.77 | 0.487 |

Example eye-tracker accuracy in different intensity light

|  | Light | | | | | | | |
| --- | --- | --- | --- | --- | --- | --- | --- | --- |
| Index | 9.95 | 15.62 | 27.60 | 37.60 | 57.00 | 60.46 | Average | Stdev |
| 1 | 2.54 ± 1.28 | 1.61 ± 0.43 | 1.71 ± 2.28 | 3.31 ± 1.04 | 2.40 ± 1.77 | 1.52 ± 0.81 | 2.182 | 0.698 |
| 2 |  | 1.59 ± 0.44 | 1.64 ± 0.71 | 0.95 ± 0.65 | 2.91 ± 0.98 | 1.01 ± 0.22 | 1.620 | 0.788 |
| 3 |  | 1.58 ± 0.14 | 1.82 ± 1.00 | 0.92 ± 0.48 | 3.46 ± 1.42 | 1.62 ± 1.12 | 1.880 | 0.945 |
| Average | 2.54 | 1.59 | 1.72 | 1.73 | 2.92 | 1.38 | 1.98 | 0.811 |

In another experiment carried out by the inventors, infrared images of the eyes from 35 participants were collected. During the process, each participant was required to gaze at 9 target points in the foreground field of vision in sequence and stare for 2 s. For each target point, the near eye camera can collect about 200 eye images. Data from 27 participants were used for training and the left for testing.

As shown in the following table, end-to-end gaze mapping has lower accuracy of gaze estimation than the calibration method. Because the relative position of the near eye camera and the eye varies from person to person, it is difficult to achieve high accuracy without calibration.

As can be seen from the results, the standard deviation of gaze estimation of world camera is smaller than that of magnified world camera, which is caused by the instability of magnified world camera. The FOV of the magnified world camera is small and slight disturbance will cause large changes in the foreground image. So, only a few results are improved after matching the visual area of two world camera.

|  | World Cam | | Match | |
| --- | --- | --- | --- | --- |
| User | Avg | SD | Avg | SD |
| 1 | 6.06 | 2.29 | 5.94 | 2.60 |
| 2 | 5.29 | 2.20 | 3.76 | 2.65 |
| 3 | 3.57 | 2.11 | 6.32 | 2.64 |
| 4 | 4.15 | 1.79 | 5.70 | 2.86 |
| 5 | 4.80 | 1.98 | 5.93 | 3.14 |
| 6 | 4.99 | 3.09 | 5.18 | 1.99 |
| 7 | 5.10 | 3.08 | 6.52 | 3.29 |
| 8 | 4.05 | 1.87 | 5.48 | 1.98 |
| Average | 4.75 | 2.30 | 5.60 | 2.64 |

Theses embodiments may be advantageous in that a fine eye tracking system may be provided, specifically, an improved head-mounted eye tracker including an additional a magnified world camera and corresponding FOV matching algorithm is provided for eye-gaze tracking applications. The two world cameras may be calibrated separately and the calibration results may be combined with the estimated gaze positions of the two cameras.

Advantageously, the structure of the pupil-lab head-mounted eye tracker may be improved by adding a world camera with a smaller FOV and finer image, the two cameras may be independently calibrated to obtain more detailed foreground images. In addition, the two foreground images may be matched by setting special markers in the foreground field of two world cameras, in which the markers may be respectively detected in the fields of two world cameras to obtain the matching region of the FOV.

Moreover, a deep learning method may be adopted to process the end-to-end mapping from the eye image to gaze point and evaluate the accuracy of gaze estimation. It has been verified by a number of controlled experiments that the accuracy of eye gaze estimation is significantly improved.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing system or partly implemented by computing systems then any appropriate computing system architecture may be utilised. This will include tablet computers, wearable devices, smart phones, Internet of Things (IoT) devices, edge computing devices, stand alone computers, network computers, cloud-based computing devices and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. An eye-gaze tracking apparatus, comprising:
   a plurality of foreground cameras each arranged to capture at least a portion of a target view area of a user; and
   an eye-gaze estimation module comprising two near-eye infrared viewing cameras each arranged to capture an image of an eye of the user, to each estimate a position of a pupil of the eye based on the image of the eye of the user; and
   a calibration module;
   wherein the plurality of foreground cameras comprises a wide-angle camera having a 100° diagonal FOV covering an entire target area to estimate a wider view of the user and a magnified camera having a 60° diagonal FOV to provide a "focus" view comprising a portion of the entire target area;
   wherein the plurality of foreground cameras provide captured images with a same sampling frequency and a same maximum resolution;
   wherein the calibration module is adapted to carry out the steps of:
      arranging four markers in fixed positions of a foreground such that they create four corners of a matching area;
      obtaining a rectangular area marked by the four markers in the captured images obtained from the wide-angle camera and the magnified camera which are the matching area;
      obtaining a gaze estimation position in images captured by the magnified camera and then obtaining a matching gaze estimation position in images captured by the wide-angle camera according to a relative position of the gaze estimation positions in the rectangle formed by the four markers;
   wherein the wide-angle camera and the magnified camera are matched by mapping the gaze estimation position of the magnified camera within the matching area to a foreground image of the wide-angle camera in a calibration; and
   wherein the foreground cameras and the eye-gaze cameras are adapted to capture images of both the target view of a user and images of the eyes of the user simultaneously to determine eye-gaze positions of the user.

2. The eye-gaze tracking apparatus in accordance with claim 1, wherein the plurality of foreground cameras are adapted to capture a video stream of the user's FOV at 30 Hz with a highest image resolution of 1920*1080 pixel, and the two near-eye infrared viewing cameras are adapted to capture user's eye images at 200*200 pixels at 200 Hz.

3. The eye-gaze tracking apparatus in accordance with claim 2, wherein each of the near-eye infrared viewing cameras has a package size of 10*45*7 mm and each are adapted to capture images at 860 nm wavelength.

4. The eye-gaze tracking apparatus in accordance with claim 3, further comprising at least one infrared LED arranged to illuminate the eye of the user.

5. The eye-gaze tracking apparatus in accordance with claim 4, further comprising the calibration module arranged to facilitate a calibration of the eye-gaze estimation module according to characteristics of the eye of the user.

6. The eye-gaze tracking apparatus in accordance with claim 5, wherein the calibration module is arranged to provide a plurality of displayed markers such that the eye-gaze estimation module is arranged to map a plurality of calibration positions of the pupil of the eye of the user to the plurality of displayed markers overlaid at different positions in the target view area of a user.

7. The eye-gaze tracking apparatus in accordance with claim 5, wherein the calibration module includes a plurality of physical markers such that the eye-gaze estimation module is arranged to map a plurality of calibration positions of the pupil of the eye of the user to the plurality of physical markers disposed at different positions in the target view area of the user.

8. The eye-gaze tracking apparatus in accordance with claim 5, wherein the calibration module is arranged to facilitate calibration of the eye-gaze estimation module with respect to different target view areas of a user associated with different FOVs of the plurality of foreground cameras, and using a combined gaze estimation method based on convolutional neural network and a geometric model to get an accurate gaze position estimation.

9. The eye-gaze tracking apparatus in accordance with claim 1, wherein the eye-gaze estimation module includes a neural network arranged to process the image of the eye captured by the two eye-gaze cameras to estimate an eye-gaze angle of the user associated with the position of the pupil of the eye.

10. A method of eye-gaze tracking, comprising the steps of:
carrying out a calibration method by a calibration module;
capturing at least a portion of a target view area of a user using a plurality of foreground cameras; and
capturing an image of each eye of the user using a respective near-eye infrared viewing camera, to estimate a position of a pupil of the eye of the user based on the image of the eye;
wherein the plurality of foreground cameras comprises a wide-angle camera having a 100° diagonal FOV covering an entire target area to estimate a wider view of the user and a magnified camera having a 60° diagonal FOV associated with a "focus" view comprising a portion of the entire target area;
wherein the plurality of foreground cameras are adapted to capture images with a same sampling frequency and a same maximum resolution;
wherein the calibration method comprises the steps of:
arranging four markers in fixed positions of a foreground such that they create four corners of a matching area;
obtaining a rectangular area marked by the four markers in images obtained from the wide-angle camera and the magnified camera which are the matching area;
obtaining a gaze estimation position in images captured by the magnified camera and then obtaining a matching gaze estimation position in images captured by the wide-angle camera according to relative positions of the gaze estimation position in the rectangle formed by the four markers;
wherein the wide-angle camera and the magnified camera are matched by mapping the gaze estimation position of the magnified camera within a matching area to a foreground image of the wide-angle camera in a calibration; and
wherein the foreground cameras and the eye-gaze cameras are adapted to capture images of both the target view of a user and the images of the eyes of the user simultaneously to determine eye-gaze positions of the user.

11. The method of claim 10, wherein the plurality of foreground cameras are adapted to capture a video stream of the user's FOV at 30 Hz with a highest image resolution of 1920*1080 pixel, and the two near-eye infrared viewing cameras are adapted to capture user's eye images at 200*200 pixels at 200 Hz.

12. The method of claim 11, wherein each of the two near-eye infrared viewing cameras has a package size of 10*45*7 mm and are adapted to capture images at 860 nm wavelength.

13. The method of claim 12, further comprising the step of illuminating the eye of the user using at least one infrared LED.

14. The method of claim 10, further comprising the step of calibrating an eye-gaze estimation module according to characteristics of the eye of the user, wherein the eye-gaze estimation module is arranged to estimate the position of the pupil of the eye.

15. The method of claim 14, wherein the step of calibrating the eye-gaze estimation module comprises the steps of:
providing a plurality of displayed markers overlaid at different positions in the target view area of a user; and
mapping a plurality of calibration positions of the pupil of the eye to the plurality of displayed markers.

16. The method of claim 14, wherein the step of calibrating the eye-gaze estimation module comprises the steps of:
disposing a plurality of physical markers at different positions in the target view area of the user; and
mapping a plurality of calibration positions of the pupil of the eye to the plurality of physical markers.

17. The method of claim 14, wherein the eye-gaze estimation module is calibrated with respect to different target view areas of a user associated with different FOVs of the plurality of foreground cameras and using a combined gaze estimation method based on convolutional neural network and a geometric model to get an accurate gaze position estimation.

18. The method of claim 10, further comprising the step of processing the image of the eye captured by the two eye-gaze cameras using a neural network, to estimate an eye-gaze angle of the user associated with the position of the pupil of the eye.

* * * * *